(12) United States Patent
Lu

(10) Patent No.: US 6,539,144 B1
(45) Date of Patent: Mar. 25, 2003

(54) METHOD AND SYSTEM FOR RESTORING OPTICAL RING-NETWORKS

(75) Inventor: Xiaolin Lu, Highlands Ranch, CO (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/678,680

(22) Filed: Oct. 4, 2000

Related U.S. Application Data

(60) Provisional application No. 60/157,488, filed on Oct. 4, 1999.

(51) Int. Cl.[7] ............................................... H04B 10/20
(52) U.S. Cl. ......................................... 385/24; 359/119
(58) Field of Search ........................... 385/24; 359/119, 359/128, 124; 349/117

(56) References Cited

U.S. PATENT DOCUMENTS

| | | | | |
|---|---|---|---|---|
| 5,903,370 A | * | 5/1999 | Johnson ....................... | 359/119 |
| 5,903,371 A | * | 5/1999 | Arecco et al. ............... | 359/119 |
| 5,923,449 A | * | 7/1999 | Doerr et al. ................. | 359/125 |
| 5,930,017 A | * | 7/1999 | Davis et al. ................. | 359/128 |
| 6,097,516 A | * | 8/2000 | Almstrom .................... | 359/119 |
| 6,222,653 B1 | * | 4/2001 | Asahi .......................... | 359/110 |
| 6,331,906 B1 | * | 12/2001 | Sharma et al. .............. | 359/119 |

* cited by examiner

*Primary Examiner*—Georgia Epps
*Assistant Examiner*—Richard Hanig
(74) *Attorney, Agent, or Firm*—Oliff & Berridge, PLC

(57) ABSTRACT

A restorable optical ring-network having a primary module, and a number of secondary modules connected by two fiber-optic rings is disclosed. By configuring the secondary modules to simultaneously transmit optical signals along a clockwise and counter-clockwise direction on a first fiber-optic ring, and further configuring the secondary modules to simultaneously receive optical signals from both a clockwise and counter-clockwise direction on a second fiber-optic ring, an optical ring-network can be constructed such that, if the optical ring-network fails at a particular point, restoration can be performed by a single switching operation at the primary module.

20 Claims, 6 Drawing Sheets

METHOD AND SYSTEM FOR RESTORING OPTICAL RING-NETWORKS

This nonprovisional application claims the benefit of the U.S. provisional application No. 60/157,488 entitled "Method and Apparatus for Network Migration Configuration" filed on Oct. 4, 1999. The Applicant of the provisional application is Xiaolin Lu. The above provisional application is hereby incorporated by references including all references cited therein

BACKGROUND OF THE INVENTION

1. Field of Invention

This invention relates to method and apparatus for restoring communication in an optical ring-network.

2. Description of Related Art

Optical ring-networks, such as synchronous optical network (SONET) rings, are a predominant networking paradigm. Wavelength division multiplexed (WDM) optical ring-networks are particularly desirable because of their comparatively high communication capacity, versatility and restoration capabilities. Unfortunately, optical ring-networks, like other communication networks, are subject to occasional failures. While a variety of techniques are currently available to restore communication in a failed optical ring-network, conventional optical ring-networks rely on complex optical hardware to restore communication. As a result, optical ring-networks having restorative capability can be expensive and unreliable. Accordingly, new technologies to form optical ring-networks are desirable.

SUMMARY OF THE INVENTION

The invention provides exemplary methods and apparatus for forming optical ring-networks having relatively simple and inexpensive hardware. In various exemplary embodiments, an optical ring-network having a primary module, and a number of secondary modules connected by two fiber-optic rings is disclosed. By configuring the secondary modules to simultaneously transmit optical signals along a clockwise and counter-clockwise direction on a first fiber-optic ring, and further configuring the secondary modules to simultaneously receive optical signals from a clockwise and counter-clockwise direction on a second fiber-optic ring, an optical ring-network can be constructed such that, if the optical ring-network fails at a particular point, restoration can be performed by a single switching operation at the primary module.

Because this architecture requires only a single active component, a restorable ring-network that is both inexpensive and highly reliable can be manufactured. Other features and advantages of the present invention are described below and are apparent from the accompanying drawings and from the detailed description which follows.

BRIEF DESCRIPTION OF THE DRAWINGS

The invention will be described with references to the following figures, wherein like numerals designate like elements, and wherein.

DETAILED DESCRIPTION OF PREFERRED EMBODIMENTS

Various network technologies such as synchronous optical network (SONET) rings provide the predominant paradigm for modem optical networks. However, standard implementations of optical rings can become very expensive and complex when error recovery hardware is added. For example, conventional optical rings rely on a number of active components residing within every node within the conventional optical ring to restore communication, such as optical-switches, optical sensors and supporting electronics. However, by forming specialized secondary modules having bi-directional drop-nodes that can simultaneously receive optical signals coming from both directions of a first optical ring, and further having a bi-directional adding-node that can simultaneously output one or more optical signals in both directions along a second optical ring, a restorable optical ring-network can be devised that requires only simple switching hardware at the primary module.

Figure 1:
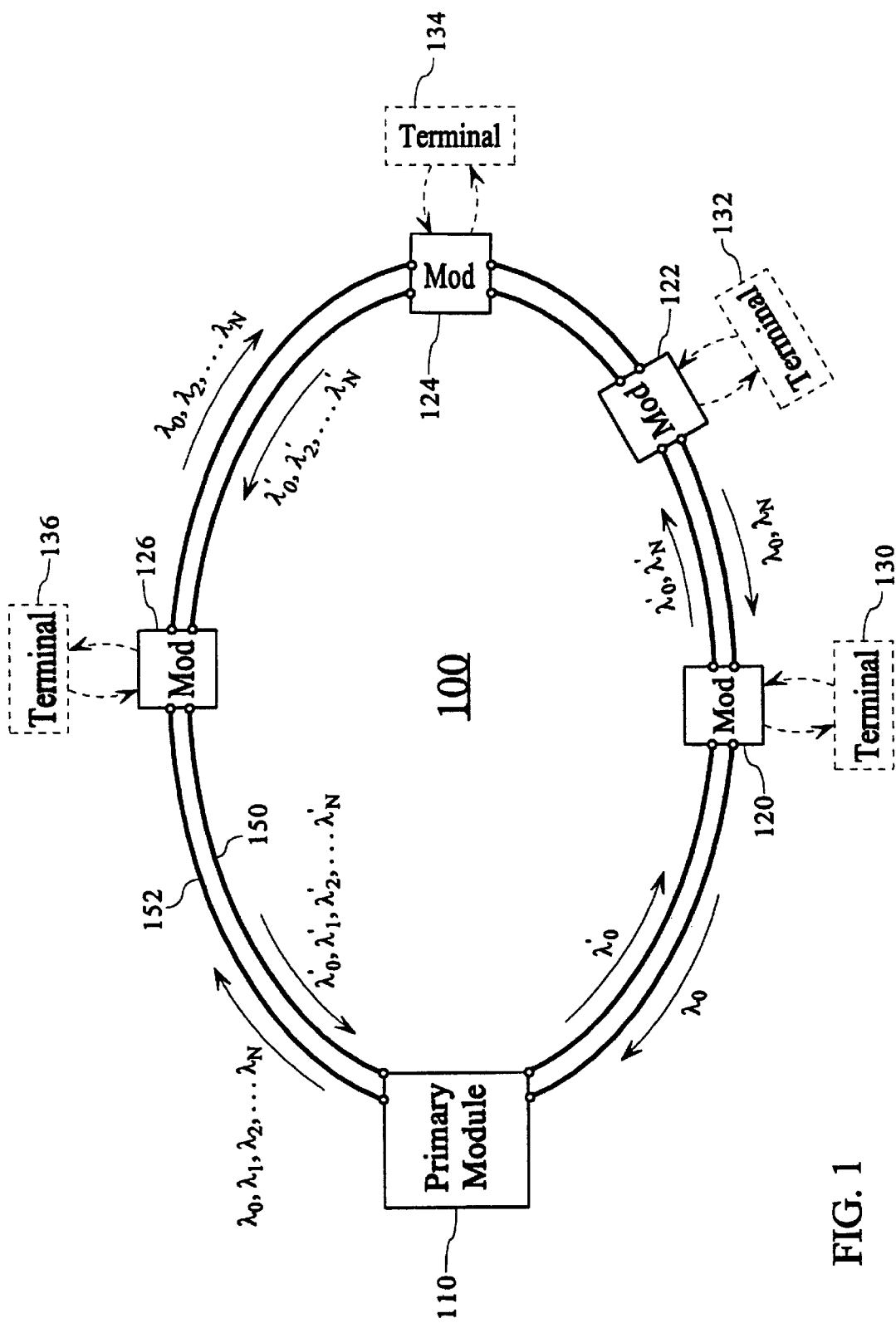
FIG. 1 is a block diagram of an exemplary optical ring-network in accordance with the present invention.

FIG. 1 is a block diagram of an exemplary optical ring-network 100. The optical ring-network 100 includes a primary module 110 coupled to a number of secondary modules 120, 122, 124 and 126 through both a first optical-conduit 150 and a second optical-conduit 152. The various secondary modules 120–126 are further coupled to a number of respective terminals 130–136.

In operation, the primary module transmits a first group of optical signals ($\lambda_0$, $\lambda_1$, $\lambda_2$ . . . $\lambda_N$) through optical-conduit 152 directly to secondary module 126 and indirectly to the other secondary modules 120–124. As the first group of optical signals is transmitted, secondary module 126 receives the first group of optical signals, drops a first optical-signal $\lambda_1$, provides the dropped optical-signal to terminal 136, and passes the remaining optical signals ($\lambda_0$, $\lambda_2$, . . . $\lambda_N$) to secondary module 124. Secondary module 124, similarly receives the remaining optical signals ($\lambda_0$, $\lambda_2$, . . . $\lambda_N$), drops a second optical-signal $\lambda_2$ and passes the remaining optical signals ($\lambda_0$, $\lambda_3$, . . . $\lambda_N$) to secondary module 122. Secondary modules 122 and 120 both similarly receive a group of optical signals ($\lambda_0$, $\lambda_3$, . . . $\lambda_N$), drop one or more optical signals to their respective terminals 132 and 130, and provide a remaining group of optical signals to the next device in the optical ring 100. Finally, secondary module 120 provides at least a single optical-signal $\lambda_0$ to the primary module 110, which receives and detects $\lambda_0$.

The primary module 110 further provides another optical-signal $\lambda'_0$ to secondary module 120 via optical-conduit 150. The secondary module 120 receives $\lambda'_0$, and further receives a second optical-signal $\lambda'_N$ from terminal 130, combines the optical signals and provides the combined optical signals ($\lambda'_0$, $\lambda'_N$) to secondary module 122. Secondary module 122 receives the counter-clockwise bound signals ($\lambda'_0$, $\lambda'_N$) from secondary module 120, adds one or more of its own optical signals provided by terminal 132 and provides a next group of counter-clockwise optical signals to modules 124, and so on, until a second group of optical signals ($\lambda'_0$, $\lambda'_1$, $\lambda'_2$ . . . $\lambda'_N$) is received and detected by the primary module 110.

While the exemplary optical ring-network 100 contains a single primary module 110 and four secondary modules 120–126, it should be appreciated that any number of secondary modules can be used. Furthermore, it should be appreciated that each module can add and drop any number of optical signals as is required by design without departing from the spirit and scope of the present invention.

Generally, the first and second group of optical signals ($\lambda_0, \lambda_1, \ldots \lambda_N$) and ($\lambda'_0, \lambda'_1, \ldots \lambda'_N$) are wavelength division multiplexed (WDM), dense wavelength division multiplexed (DWDM) or similarly configured signals with each optical-signal centered about a predetermined frequency and modulated according to a predetermined scheme to carry digital or analog information. However, in various exemplary embodiments, it should be appreciated that the first optical signals $\lambda_0$ and $\lambda'_0$ emitted by the primary module 110 can be used to both transmit information and/or to detect a break in their respective optical-conduits 152 and 150, i.e., they can act as health/failure indicators. Accordingly, in various embodiments, $\lambda_0$ and $\lambda'_0$ can be non-modulated, single-wavelength signals such as those emitted by a light-emitting diode (LED), a laser source and the like.

In various exemplary embodiments, the optical ring can be a SONET-based network, such as a light wire-II network and the like. However, the optical ring-network 100 can alternatively be based on any known or later developed optical network standard, with the primary module 110 and the secondary modules 120–126 modified as required. Still further, while the exemplary ring-network is SONET-based network passing wavelength division multiplex (WDM) optical signals, the optical ring-network 100 can alternatively be based on any other known or later developed optical technology useable to provide optical communication signals to/from the various modules 110 and 120–126, without departing from the spirit and scope of the present invention.

While the optical ring-network 100 defines various signals as traveling along both a clockwise or counter-clockwise direction, it should be appreciated that the terms "clockwise" and "counter-clockwise" are used as a convenient form of description. Accordingly, the terms "clockwise" and "counter-clockwise" can be broadly construed to describe optical signals traveling along similar optical paths in opposite directions. For example, a first group of optical signals can be arbitrarily defined as traveling in clockwise directions as they pass through three modules A, B and C, regardless of any intermediate route taken between modules. Similarly, a second group of optical signals can be considered as traveling in a counter-clockwise direction as applied to the three modules as they pass from module C to module B then to module A. Furthermore, the clockwise and counter-clockwise description would pertain to at least modules A, B and C regardless of any intermediate paths taken or any relationship the first and second groups of optical signals have with any other modules in an optical ring-snetwork.

Figure 2:
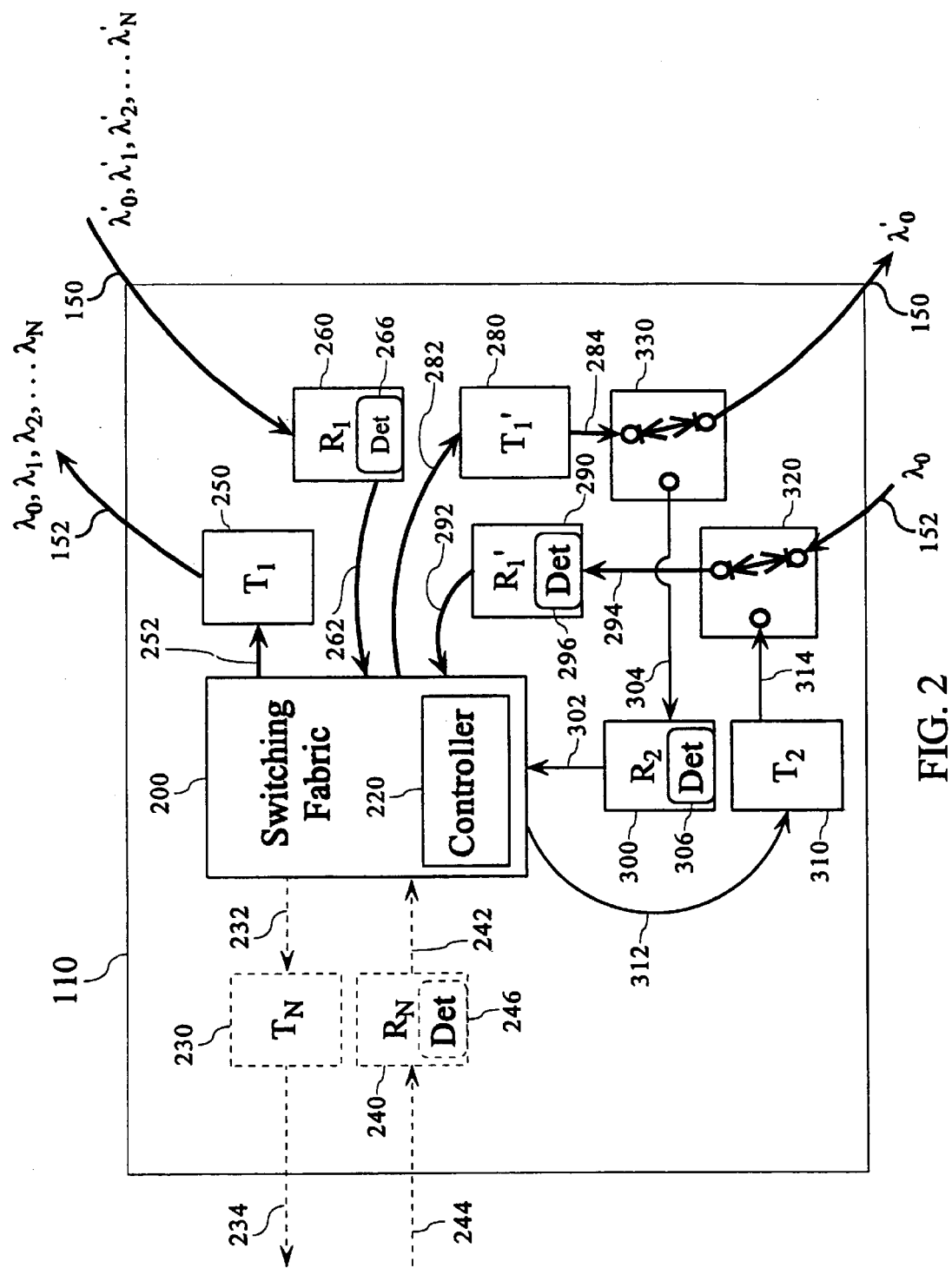
FIG. 2 is a block diagram of an exemplary primary module as shown in FIG. 1

FIG. 2 is a block diagram of an exemplary primary module 110. The primary module 110 contains a switching fabric 200 with an embedded controller 220. The switching fabric 200 is coupled to a clockwise transmitter 250, a counter-clockwise transmitter 280, a clockwise receiver 290 with error detection circuits 296, a counter-clockwise receiver 260 with error detection circuits 266, a restoration receiver 300 with error detection circuits 306 and a restoration transmitter 310. The switching fabric 200 is further coupled to an external transmitter 230 and an external receiver 240 having error detection circuits 246. Additionally, the clockwise receiver 290 and restoration transmitter 310 are coupled to a first switch 320, which in turn, is further coupled to optical-conduit 152, and the counter-clockwise transmitter 280 and restoration receiver 300 are coupled to a second optical-switch 330, which is further coupled to optical-conduit 150.

In operation, the switching fabric 200, under control of the controller 220, transmits various WDM optical signals to an external terminal (not shown) using the external transmitter 230 and links 232 and 234. The switching fabric 200 further receives various optical signals using the external receiver 240 and links 242 and 244. The switching fabric 200 further transmits a first group of optical signals ($\lambda_0, \lambda_1, \lambda_2 \ldots \lambda_N$) to the clockwise transmitter 250 via link 252.

The clockwise transmitter 250 then provides the first group of optical signals ($\lambda_0, \lambda_1, \lambda_2 \ldots \lambda_N$) to optical-conduit 152, to be received by a number of secondary modules (not shown). As described above, each of the secondary modules 120–126 can then remove a number of optical signals from the group of optical signals ($\lambda_0, \lambda_1, \lambda_2 \ldots \lambda_N$) such that at least a single optical-signal $\lambda_0$ remains in the optical conduit 152 and can be received by the first optical-switch 320. The first optical-switch 320 receives $\lambda_0$ and routes $\lambda_0$ to the clockwise receiver 290, which routes $\lambda_0$ back to the switching fabric 200. The exemplary detection circuits 296 of the counter-clockwise receiver 290 can monitor the presence of $\lambda_0$, verify its presence, and provide a verification signal to the controller 220 via link 292.

In further operation, the switching fabric 200 provides a single optical-signal $\lambda'_0$ to the counter-clockwise transmitter 280, which provides $\lambda'_0$ to the second optical-switch 330 which, in turn, passes $\lambda'_0$ to various secondary modules (not shown) via optical-conduit 150. As described above, the various secondary modules receives $\lambda'_0$, add one or more optical signals ($\lambda'_1, \lambda'_2 \ldots \lambda'_N$) and provide this group of optical signals ($\lambda'_0, \lambda'_1, \lambda'_2 \ldots \lambda'_N$) to the counter-clockwise receiver 260.

The counter-clockwise receiver 260 accordingly receives the optical signals ($\lambda'_0, \lambda'_1, \lambda'_2 \ldots \lambda'_N$), detects for the presence of $\lambda'_0$ using error detection circuits 296. Further, the counter-clockwise receiver 260 passes the optical signals ($\lambda'_0, \lambda'_1, \lambda'_2 \ldots \lambda'_N$) and a verification signal to the switching fabric 200 and controller 220 via link 262.

The exemplary switching fabric 200 is a collection of various optical components that can controllably route any received optical-signal at any wavelength, optionally convert the wavelengths of the received optical-signal to another optical frequency and provide the altered optical-signal to any other device within the primary module 110. In various embodiments, the switching fabric 200 can be an optical switch such as a micro-electrical mechanical system (MEMS) having an array of micro-mirrors that can redirect optical signals to various path as the signals pass through the optical switch. Further, the optical switch can be based on the total internal reflection of a fluid-containing planar light-wave circuit (PLC), otherwise known as bubble technology. However, the switching fabric 200 can be any based on any other known or later developed system or device that can receive various optical signals, alter the wavelengths of the optical signals and provide the altered optical signals to various other devices, without departing from the spirit and scope of the present invention.

Furthermore, in various other exemplary embodiments, the switching fabric 200 can be an electronically based device receiving routing and transmitting various electronic signals to/from the other devices within the primary module 110, without departing from the spirit and scope of the present invention.

Accordingly, the various transmitters 230, 250, 280 and 310 can be any device that can receive a number of optical signals and route the various optical signals to various conduits such as optical fibers. However, in other exemplary embodiments, the various transmitters 230, 250, 280 and 310 can be electro-optical devices that can receive various electronic signals from the switching fabric 210, convert the electronic signals to optical signals of various wavelengths, configure the optical signals to a WDM configuration and provide the WDM optical signals to an external device or conduit.

The various receivers 240, 260, 290 and 300, like the various transmitters 230, 250, 280 and 310, are optic-based devices capable of receiving any number of WDM optical signals, amplifying the optical signals and providing the amplified signals to the switching fabric 200. However, the receivers 240, 260, 290 and 300 can similarly be a combination of electronic and optic-based devices capable of receiving various optical signals, converting the optical signals to electronic form and providing the various electronic signals to the switching fabric 200.

The corresponding error detection circuits 246, 266, 296 and 306 in the various receivers 240, 260, 290 and 300 are simple detectors configured to detect the presence/absence of one or more health signals. However, the error detection circuits 246, 266, 296 and 306 alternatively can be or any other known or later developed device capable of detecting an error condition such as the presence/absence of one or more optical signals, without departing from the spirit and scope of the present invention.

In normal operation, the first optical-switch 320 receives WDM optical signals from conduit 152, and routes the received signals to the clockwise receiver 290. However, in a second mode of operation, the first optical-switch 320 can also receive restoration optical signals from the restoration transmitter 310, and route the restoration optical signals to conduit 152. The particular mode of the first optical-switch 310 is controlled by the controller 220 via a first control link (not shown).

Similarly, the second optical-switch 330 normally receives a group of WDM optical signals from the counter-clockwise transmitter 280, and routes the WDM optical signals to conduit 150. However, in a second mode of operation, the second optical-switch 320 can also receive various optical signals, from conduit 150 and route these optical signals to the restoration receiver 300. Like the first optical-switch 310, the second optical-switch 320 is controlled by the controller 220 via a second control link (not shown).

The exemplary optical-switches 320 and 330 can be micro-electrical mechanical systems (MEMS) having an array of micro-mirrors that can redirect optical signals to various path as the signals pass through the optical switch. Further, the optical-switches 320 and 330 can be based on the total internal reflection of a fluid-containing planar light-wave circuit (PLC), otherwise known as bubble technology. However, the optical-switches 320 and 330 can alternatively be any other known or later developed device or system that can receive one or more optical signals and controllably route the received optical signals to another device, without departing from the spirit and scope of the present invention. Still further, the first and second optical-switch 320 and 330 can be circulators or any number of other devices capable of passively receiving and routing optical signals between various devices, without departing from spirit and scope of the present invention.

Figure 3:
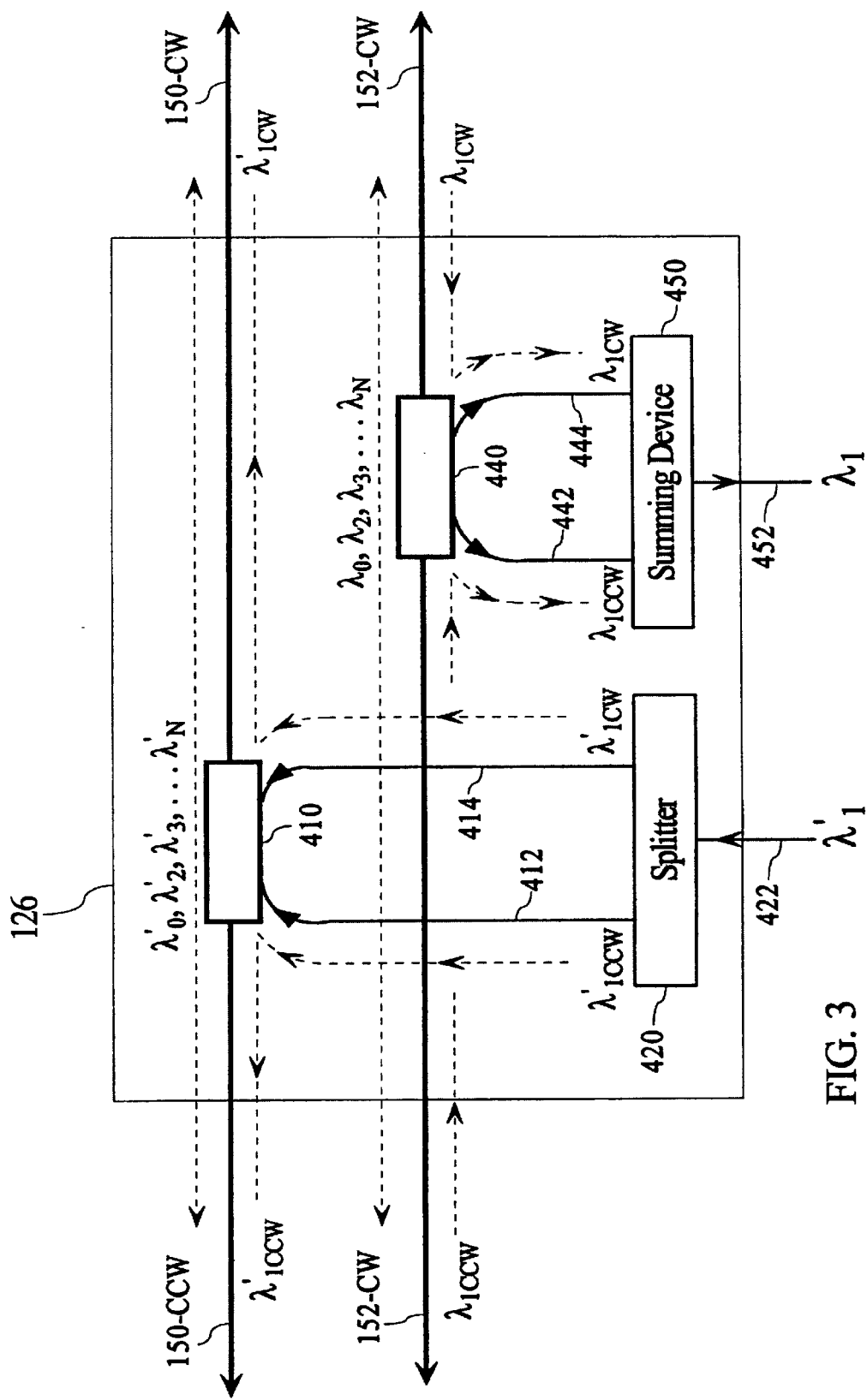
FIG. 3 is a diagram of an exemplary secondary module as shown in FIG. 1.

FIG. 3 is a block diagram of an exemplary secondary module 126, containing a splitter 420 coupled to a first optical conduit via an adding-node 410, and further containing a summming device 450 coupled to a second optical conduit via a drop-node 440.

In operation, the splitter 420 receives a first optical-signal $\lambda'_1$ via conduit 422, splits $\lambda'_1$ into two portions $\lambda'_{1CW}$ and $\lambda'_{1CW}$, and provides the two portions $\lambda'_{1CW}$ and $\lambda'_{1CW}$ to the adding-node 410 through conduits 414 and 412, respectively. The adding-node 410 receives the two portions $\lambda'_{1CW}$ and $\lambda'_{1CCW}$, and provides the first portion $\lambda'_{1CW}$ to optical-conduit 150-CW in a clockwise direction, and provides the second portion $\lambda'_{1CCW}$ to optical-conduit 150-CCW in a counter-clockwise direction. As the adding-node 410 receives and distributes the two optical signal portions $\lambda'_{1CW}$ and $\lambda'_{1CCW}$, it should be appreciated that the adding-node 410 can also pass a number of other optical signals ($\lambda'_0$, $\lambda'_2$, $\lambda'_3$ ... $\lambda'_N$) without hindering or otherwise substantially affecting them.

While the exemplary splitter 420 and adding-node 410 receives and distributes a single optical-signal $\lambda'_1$, it should be appreciated that the splitter 420 and adding-node 410 can receive any number of optical signals, split the optical signals and distribute the optical signals to optical-conduits 150-CW and 150-CCW as required by design.

The exemplary splitter 420 is an optical splitter containing a variety of standard optical components. However, in various other exemplary embodiments, the splitter 410 can be any other known or later developed device that can receive one or more optical signals and provide portions or images of the optical signals to the adding-node 410, without departing from the spirit and scope of the present invention.

In various exemplary embodiments, the adding-node 410 can be a defraction-based wavelength selective optical device such as those described in U.S. Pat. No. 5,805,751 to Kewitsch et al. and U.S. Pat. No. 5,875,272 to Kewitsch et al., both of which are incorporated herein by reference in their entirety. However, the adding-node 410 can also be any known or later developed device that can receive one or more added optical signals, and provide the added optical signals in both a clockwise and counter-clockwise direction in an optical-conduit while simultaneously passing other optical signals through the optical-conduit.

As discussed above, the secondary module can drop various optical signals from an optical-conduits, as well as add them. In normal operation, the drop-node 440 receives a group of optical signals ($\lambda_0$, $\lambda_1$, $\lambda_2$ ... $\lambda_N$) from either a clockwise or counter-clockwise direction, drop a first clockwise signal $\lambda_{1CW}$ or a first counter-clockwise signal $\lambda_{1CCW}$ to the summing device 450 via links 444 or 442 respectively, and pass the remaining optical signals ($\lambda_0$, $\lambda_2$, $\lambda_3$ ... $\lambda_N$), without hindering or otherwise substantially affecting the remaining optical signals ($\lambda_0$, $\lambda_2$, $\lambda_3$ ... $\lambda_N$)

The summing device 450 receives the optical-signal $\lambda_{1CW}$ or $\lambda_{1CCW}$ through one of the optical-conduits 444 or 442 and routes $\lambda_1$ to an external terminal (not shown) via link 452. While, in normal operation, the exemplary drop-node 440 receives a single optical-signal from either a clockwise or counter-clockwise direction, it should be appreciated that the drop-node 440 can simultaneously receive any number of optical signals from either the clockwise or counter-clockwise direction, drop one or more optical signals from both the clockwise and counter-clockwise bound groups of optical signals and provide both images of the optical signals to the summing device 450. Likewise, the summing device 450 can simultaneously receive separate optical signals from links 442 and 444, combine the optical signals and provide the combined optical signals to link 452.

In various exemplary embodiments, the drop-node 440 can be a defraction-based wavelength selective optical device such as those described in U.S. Pat. No. 5,805,751 to Kewitsch et al. and U.S. Pat. No. 5,875,272 to Kewitsch et al. However, the drop-node 440 can also be any known or later developed device that can simultaneously receive a WDM group of optical signals from both a clockwise and counter-clockwise direction, and drop one or more of the received optical signals while passing the remaining optical signals.

The exemplary summing device 450 is an optical combiner. However, in various other exemplary embodiments, the summing device 450 can be any other known or later developed device that can receive optical signals from conduits 442 and 444 and provide the optical signals to conduit 452.

As discussed above, an advantage to the secondary module 126 is that it contains no moving or reconfiguring parts. Accordingly, upon a failure of a ring-network, the secondary module 126 will automatically and inherently handle the failure to restore communication without reconfiguring.

Figure 4:
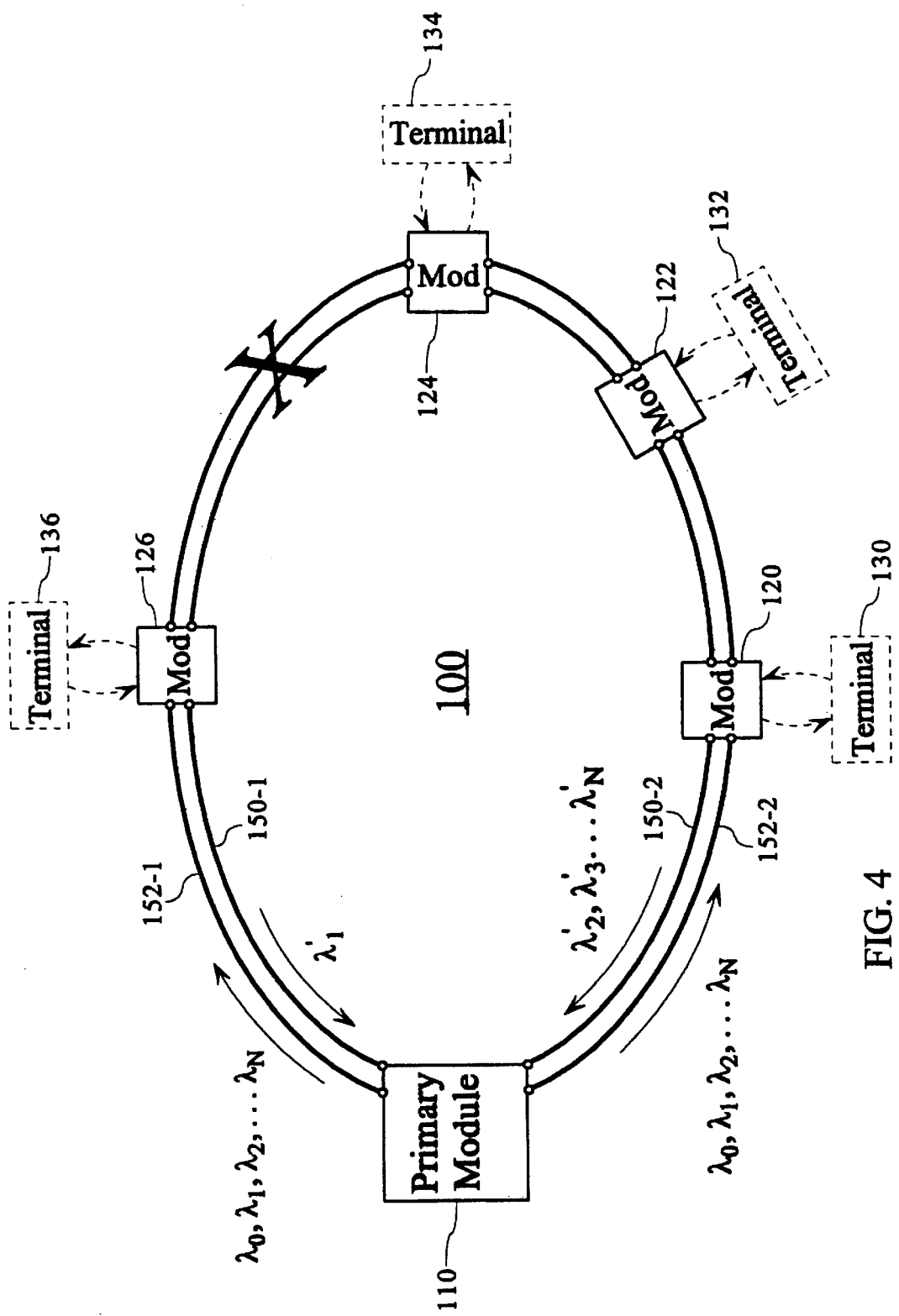
FIG. 4 is a block diagram of the optical ring of FIG. 1 after a failure.

FIG. 4 is a block diagram of the optical ring-network 100 of FIG. 1, where the first and second optical-conduits 150 and 152 have been severed between secondary modules 124 and 126, thus dividing optical-conduit 150 into a first and second portion 150-1 and 150-2, and further dividing optical-conduit 152 into two portions 152-1 and 152-2. As shown in FIG. 4, because the various optical signals cannot traverse the entirety of the optical ring-network 100, the primary module 110 will not receive either $\lambda_0$, or $\lambda'_0$ via the sub-portions 150-1 and 152-2, respectively.

Upon detecting the absence of either $\lambda_0$ or $\lambda'_0$, the primary module 110 can reconfigure to transmit the first group of optical signals ($\lambda_0, \lambda_1, \lambda_2 \ldots \lambda_N$) on both the first portion 152-1 and the second portion 152-2 of optical-conduit 152 such that all of the secondary modules 120–126 can receive the appropriate optical signals either from the clockwise or counter-clockwise direction. That is, for the example of FIG. 4, secondary module 126 can receive $\lambda_1$ via portion 152-1, and the other secondary modules 120–124 can receive optical signals ($\lambda_2, \lambda_3 \ldots \lambda_N$) via portion 152-2.

The primary module 110 can further configures itself to receive optical signals from both portions 150-1 and 150-2 of conduit 150. Accordingly, the primary module 110 of the exemplary ring-network 100 can receive an optical signal $\lambda'_1$ from the first sub-portion 150-1, and further receive optical signals ($\lambda_2, \lambda_3 \ldots \lambda_N$) from the second sub-portion 150-2. Once received, the primary module 110 can combine $\lambda'_1$ with ($\lambda'_2, \lambda'_3 \ldots \lambda_N$) and operate upon the combined optical signals as required.

As discussed above, the various secondary modules 120–126 transmit images of their various added optical signals both in a clockwise and counter-clockwise direction and further pass other optical signals both in a clockwise and counter-clockwise direction without obstruction. Accordingly, secondary module 126 can provide $\lambda'_1$ to the primary module in a counter-clockwise direction while secondary modules 120–124 can provide their added optical signals ($\lambda'_2, \lambda_3 \ldots \lambda'_N$) to the primary module 110 in a clockwise direction.

Furthermore, secondary module 126 will continue to receive the first group of optical signals ($\lambda_0, \lambda_1, \lambda_2 \ldots_N$) in a clockwise direction. However, secondary modules 120–124 will now receive an image the first group of optical signals ($\lambda_0, \lambda_1, \lambda_2 \ldots \lambda_N$) from the counter-clockwise direction. Accordingly, communication to and from all of the secondary modules 120–126 is restored without requiring reconfiguration at the secondary modules 120–126.

Figure 5:
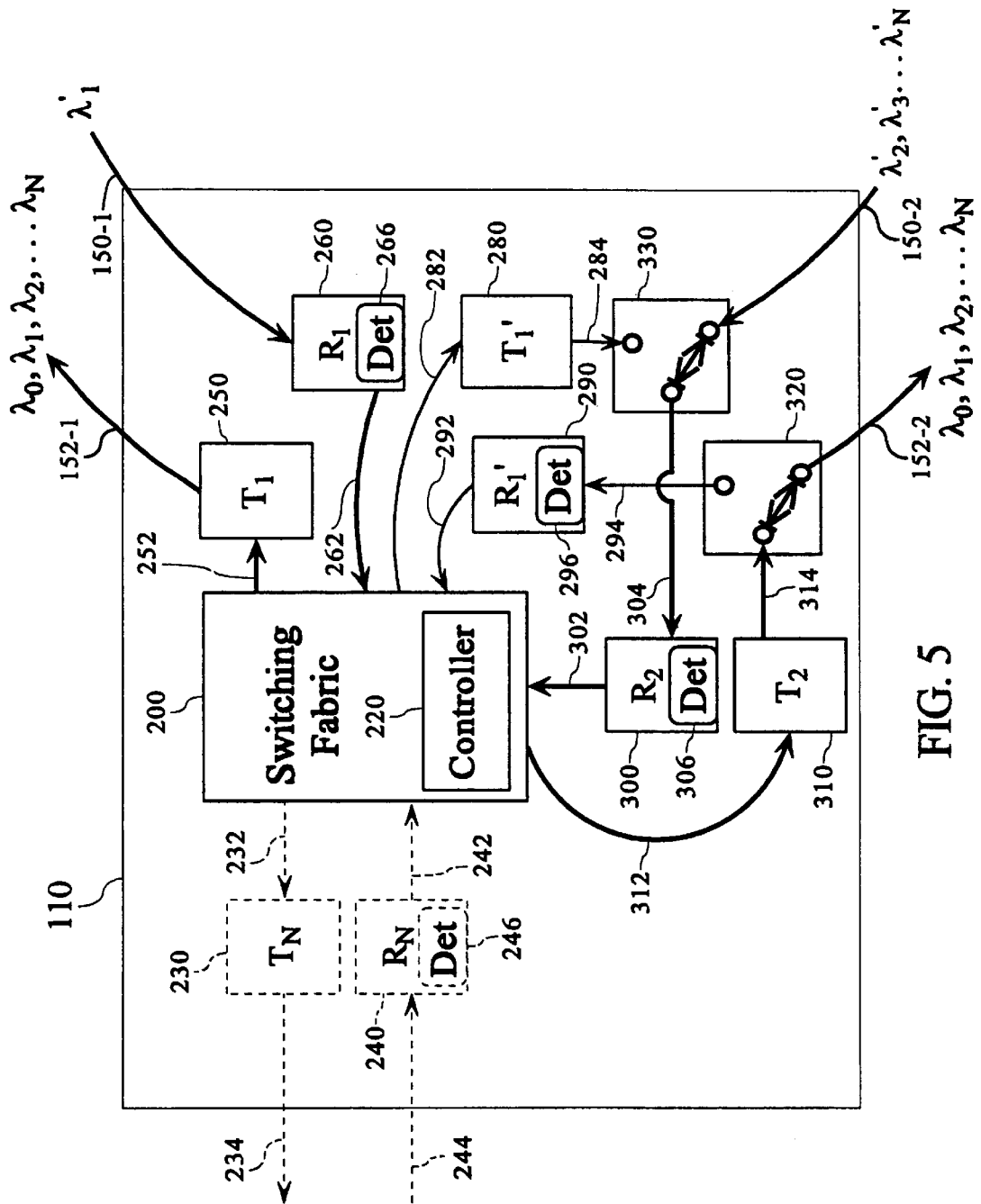
FIG. 5 is a block diagram of the primary module of FIG. 2 reconfigured to restore communication after a failure.

FIG. 5 is a block diagram of the primary module 110 of FIG. 1 after a fault has occurred. As discussed above, the first and second optical-switches 320 and 330 can be controllably reconfigured. Accordingly, the first optical-switch 320, instead of receiving an optical-signal and providing the received optical-signal to the counter-clockwise receiver 290, now receives optical signals from the restoration transmitter 310 and provides these optical signals to optical-conduit 152-2 in a counter-clockwise direction to the various secondary modules. Similarly, the second optical-switch 330, instead of receiving optical signals from the counter-clockwise transmitter and providing these signals to conduit 150, the second optical-switch 330 now receives various optical signals from the optical-conduit 150-2 and provides these received optical signals to the restoration receiver 300, which can then route these optical signals to the switching fabric 200.

As discussed above, because both the clockwise transmitter and the restoration transmitter transmit identical pairs of signals ($\lambda_0, \lambda_1, \lambda_2 \ldots_N$) to both sub-portions 152-1 and 152-2, each secondary module within the optical ring will receive the optical signals either from a clockwise or counter-wise path. Similarly, because each secondary module provides its optical signals both in a clockwise and counter-clockwise direction, the counter-clockwise receiver 260 and/or the restoration receiver 300 together will receive all of the optical signals provided by the secondary modules.

Figure 6:
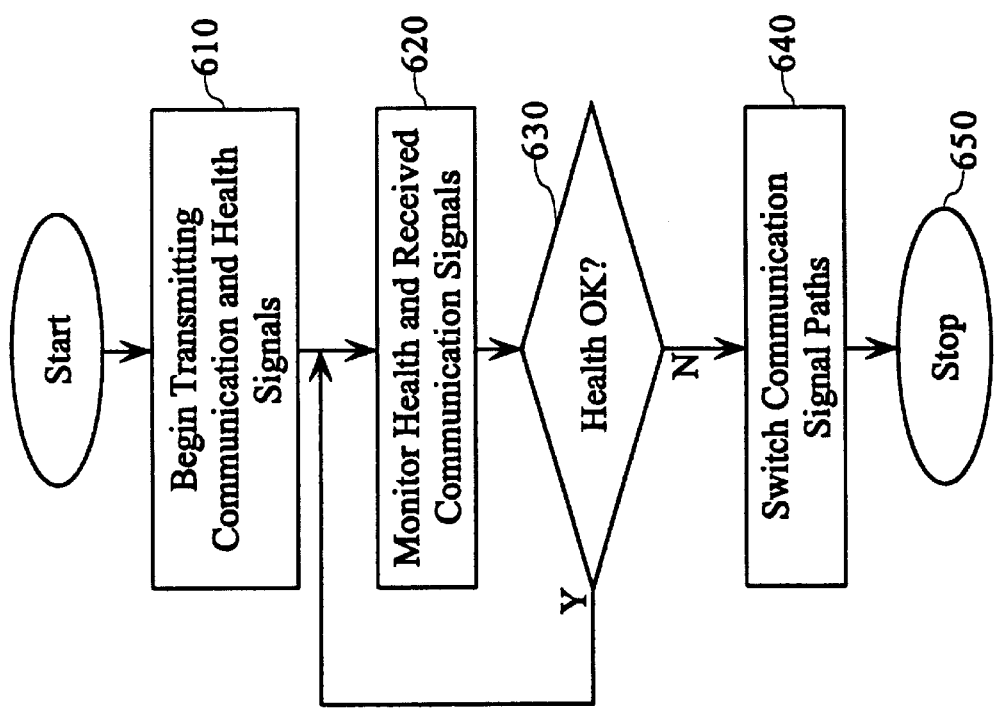
FIG. 6 is a flow chart outlining an exemplary operation for restoring communication in an optical ring-network.

FIG. 6 is a flow chart outlining a first exemplary operation for restoring communication in an optical ring-network. The process starts in step 610 where a primary module begins transmitting a first group of optical signals ($\lambda_0, \lambda_1, \lambda_2 \ldots \lambda_N$) including a first health signal $\lambda_0$ in a clockwise direction on a first optical-conduit, and further begins transmitting at least a second health signal $\lambda'_0$ in a counter-clockwise direction on a second optical-conduit. The clockwise optical signals ($\lambda_0, \lambda_1, \lambda_2 \ldots \lambda_N$) are received by various secondary modules along the optical ring-network, and the first health signal $\lambda_0$ is looped back to the primary module. Simultaneously, the various secondary modules provide a number of other optical signals ($\lambda'_1, \lambda'_2, \lambda_3 \ldots \lambda_N$), which are combined with the second health signal $\lambda'_0$ on the second optical-conduit to be received by the primary module in a counter-clockwise direction. Next, in step 620, the various health signals, as well as the various received signals generated by various secondary modules within the optical ring are monitored by the primary module. The operation continues to step 630.

In step 630, a determination is made as to whether either of the clockwise health signal $\lambda_0$ or the counter-clockwise health signal $\lambda'_0$ indicates an error condition, i.e., is properly received. If both health signals are properly received, control jumps back to step 620 where the health signals are further monitored; otherwise, control continues to step 640. While the exemplary technique determines health by monitoring the health signals $\lambda_0$ and $\lambda'_0$, it should be appreciated that the health of an optical ring-network can be determined by various other techniques, such as monitoring all of the received optical signals in a WDM, and checking for one or more lost optical signals. For example, if one or more expected optical signals are not received, then it can be assume that the optical ring has failed without requiring a primary module transmit a health signal.

In step 640, because one or more health signals were not detected at the primary module, or if there is some other indication of an error condition, the primary module of the ring-network is reconfigured such that images of the first group of optical signals ($\lambda_0, \lambda_1, \lambda_2 \ldots \lambda_N$) are transmitted both on a clockwise and counter-clockwise portion of a first optical-conduit. The primary module is further reconfigured to receive a second set of optical signals ($\lambda'_1, \lambda'_2, \lambda'_3 \ldots \lambda'_N$) both from a counter-clockwise and a clockwise direction from the second optical-conduit. Accordingly, communication is restored, and the process continues to step 650 where the operation stops.

As shown in FIGS. 1–5, the systems and methods of this invention are preferably implemented on using various optical hardware and integrated electrical and optical circuits. However, the systems and methods can also be implemented using any combination of known or later developed technologies. In general, any device on which the various electrical and optical-conduits and interfaces capable of implementing the various elements of FIGS. 1–5 and the flowchart of FIG. 6 can be used to implement the optical network functions.

While this invention has been described in conjunction with specific embodiments thereof, it is evident that many alternatives, modifications, and variations will be apparent to those skilled art. Accordingly, the preferred embodiments of the invention as set forth herein are intended to be illustrative, not limiting. Various changes may be made without departing from the spirit and scope of the invention.

What is claimed is:

1. A restorable optical network, comprising:
    a primary module;
    one or more second modules;
    a first optical ring connecting the primary module and the one or more second modules; and
    a second optical ring connecting the primary module and the one or more second modules,
    wherein at least one of the one or more second modules includes an adding-node that transmits one or more added optical signals in a clockwise and counter-clockwise direction on the first optical ring.

2. The restorable optical network of claim 1, wherein the at least one or more second modules further includes at least a drop-node that receives one or more dropped optical signals from the second optical ring.

3. The restorable optical network of claim 2, wherein the drop-node is configured to simultaneously receive the one or more dropped optical signals from the second optical ring from at least one of a clockwise and counter-clockwise direction.

4. The restorable optical network of claim 3, wherein the at least one or more second modules further includes a summing node that receives one of the one or more dropped counter-clockwise optical signals and dropped clockwise optical signals and routes the received optical signals to an output port.

5. The restorable optical network of claim 3, wherein the at least one or more second modules further comprises a splitting node that receives one or more optical signals, divides the one or more received optical signals into clockwise and counter-clockwise portions and provides the clockwise and counter-clockwise portions to the adding-node.

6. The restorable optical network of claim 3, wherein the primary module includes a clockwise transmitter coupled to the second optical ring, a counter-clockwise transmitter coupled to the first optical ring and a restoration transmitter associated with the second optical ring, wherein if a first error condition is detected, the restoration transmitter transmits one or more restoration optical signals.

7. The restorable optical network of claim 6, wherein the primary module further includes at least a clockwise receiver coupled to the second optical ring, a counter-clockwise receiver coupled to the first optical ring and a restoration receiver associated with the first optical ring, wherein if a second error condition is detected, the restoration receiver receives one or more imaged optical signals.

8. The restorable optical network of claim 5, wherein the primary module includes a clockwise transmitter coupled to the second optical ring, a counter-clockwise transmitter coupled to the first optical ring and a restoration transmitter associated with the second optical ring, wherein if a first error condition is detected, the restoration transmitter transmits one or more restoration optical signals.

9. The restorable optical network of claim 8, wherein the primary module further includes at least a clockwise receiver coupled to the second optical ring, a counter-clockwise receiver coupled to the first optical ring and a restoration receiver associated with the first optical ring, wherein if a second error condition is detected, the restoration receiver receives one or more imaged optical signals.

10. A method for restoring communication in an optical network comprising:
    transmitting one or more clockwise optical signals in a first optical ring at a first port of a primary module;
    detecting at least one of the clockwise optical signals at a second port of the primary node; and
    if an error condition is detected, transmitting one or more restoration optical signals at the second port of the primary module.

11. The method of claim 10, further comprising:
    receiving one or more counter-clockwise optical signals from a second optical ring at a third port of the primary module; and
    if an error condition is detected on the second optical ring, receiving at a fourth port of the primary module, one or more clockwise optical signals.

12. The method of claim 9, further comprising simultaneously transmitting from one or more secondary modules, one or more second optical signals in both a clockwise and counter-clockwise direction on the second optical ring.

13. The method of claim 12, further comprising receiving at least one of the one or more clockwise optical signals by one or more secondary modules.

14. The method of claim 13, wherein if an error condition is detected, further receiving at least one of the one or more restoration optical signals by the one or more secondary modules.

15. The method of claim 14, wherein at least one of the one or more secondary modules is configured to simultaneously receive clockwise and counter-clockwise optical signals.

16. A method for communicating in an optical network having at least a primary module and one or more secondary modules, comprising:
    on a first optical ring, simultaneously transmitting one or more optical signals in a clockwise and counter-clockwise direction by at least one of the one or more secondary modules; and
    on a second optical ring, simultaneously detecting for one or more optical signals in a clockwise and counter-clockwise direction by at least one of the one or more secondary modules.

17. The method of claim 16, further comprising:
    receiving the one or more optical signals in a clockwise direction at the primary module;

detecting for an error condition at the primary module; and if an error condition occurs, receiving at least one of the one or more optical signals in a counter-clockwise direction at the first module.

18. The method of claim 16, further comprising:

transmitting one or more transmitted optical signals in a clockwise direction at the primary module;

detecting for an error condition at the primary module; and if an error condition occurs, transmitting at least one of the one or more optical signals in a counter-clockwise direction at the first module.

19. The method of claim 18, wherein if an error condition occurs, transmitting substantially all of the transmitted optical signals in both a clockwise and counter-clockwise direction at the primary module.

20. The method of claim 17, further comprising:

transmitting one or more transmitted optical signals in a clockwise direction at the primary module; and if an error condition occurs, transmitting at least one of the one or more optical signals in a counter-clockwise direction at the first module.

* * * * *